US009756570B1

(12) United States Patent  
Ramachandra (10) Patent No.: US 9,756,570 B1  
(45) Date of Patent: Sep. 5, 2017

(54) METHOD AND A SYSTEM FOR OPTIMIZING BATTERY USAGE OF AN ELECTRONIC DEVICE

(71) Applicant: Wipro Limited, Bangalore (IN)

(72) Inventor: Manjunath Ramachandra, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/242,870

(22) Filed: Aug. 22, 2016

(30) Foreign Application Priority Data

Jun. 28, 2016 (IN) .............................. 201641022131

(51) Int. Cl.
| | |
|---|---|
| *H04B 17/00* | (2015.01) |
| *H04W 52/02* | (2009.01) |
| *H04W 4/00* | (2009.01) |
| *H04W 72/04* | (2009.01) |

(52) U.S. Cl.  
CPC ....... *H04W 52/0258* (2013.01); *H04W 4/005* (2013.01); *H04W 72/0473* (2013.01)

(58) Field of Classification Search  
CPC ............. H04W 52/00; H04W 52/0209; H04W 52/0251; H04W 52/0261; H04B 17/00  
See application file for complete search history.

(56) References Cited

U.S. PATENT DOCUMENTS

| | | | |
|---|---|---|---|
| 8,085,342 | B2 | 12/2011 | Agan et al. |
| 2004/0257462 | A1 | 12/2004 | Goris et al. |
| 2005/0120128 | A1 | 6/2005 | Willes et al. |
| 2006/0203903 | A1 | 9/2006 | Shih et al. |
| 2009/0189981 | A1 | 7/2009 | Siann et al. |
| 2010/0027426 | A1 | 2/2010 | Nair et al. |
| 2010/0141762 | A1 | 6/2010 | Siann et al. |
| 2014/0115372 | A1 | 4/2014 | Myrberg et al. |
| 2015/0338892 | A1 | 11/2015 | Culbert et al. |
| 2015/0365265 | A1 | 12/2015 | Kenney et al. |
| 2016/0057803 | A1* | 2/2016 | Kim .................. H04W 52/0209 370/329 |

FOREIGN PATENT DOCUMENTS

WO     WO 02/33558     4/2002

OTHER PUBLICATIONS

Extended European International Search Report issued in the European Patent Office in counterpart European Application No. 16191608.5, dated Jun. 29, 2017, 10 pages.

\* cited by examiner

*Primary Examiner* — Blane Jackson  
(74) *Attorney, Agent, or Firm* — Finnegan, Henderson, Farabow, Garrett & Dunner LLP (57) ABSTRACT

A method and a system are provided for optimizing battery usage of an electronic device. The method comprises determining, by a battery optimization unit, a degree of criticality of environment in which one or more sensors are operating based on one or more pre-defined conditions. The method further comprises determining, by the battery optimization unit, a plurality of parameters comprising an energy level of the electronic device, an available processing power, and an available communication network bandwidth associated with the electronic device. The method further comprises processing, by the battery optimization unit, a first portion of sensor data locally based on the degree of criticality of environment and a priority based rule engine, wherein the priority based rule engine is configured to optimize battery usage of the electronic device based on the plurality of parameters.

15 Claims, 4 Drawing Sheets

FIG. 4: Example Computer System

METHOD AND A SYSTEM FOR OPTIMIZING BATTERY USAGE OF AN ELECTRONIC DEVICE

TECHNICAL FIELD

The present subject matter is related, in general to power management, and more particularly, but not exclusively to a method and a system for optimizing battery usage of an electronic device.

BACKGROUND

Existing consumer electronic devices are battery operated and have a limited battery power. The battery power may be sufficient to perform regular tasks, however when a critical task is to be executed for a longer period of time, then the battery power may not be sufficient. For example, a security camera that captures images in high resolution transmits compressed images to a nearby node may drain the battery power rapidly and might turn off thereby leading to a miss of crucial information thereafter.

In order to conserve battery power, if the computation is reduced at the electronic device then the amount of data to be transmitted increases. Thus, the data transmission may consume a lot of battery power. Additionally, if the processing power of the electronic device is low then the time required to perform one or more computations on the electronic device is high thereby consuming a lot of battery power. Thus, there is a need to optimize battery usage of an electronic device based on energy level of the battery, processing power of the electronic device and available communication network bandwidth.

Further limitations and disadvantages of conventional and traditional approaches will become apparent to one of skill in the art, through comparison of described systems with some aspects of the present disclosure, as set forth in the remainder of the present application and with reference to the drawings.

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for optimizing battery usage of an electronic device. The method comprises determining, by a battery optimization unit, a degree of criticality of environment in which one or more sensors are operating based on one or more pre-defined conditions. The method further comprises determining, by the battery optimization unit, a plurality of parameters comprising an energy level of the electronic device, an available processing power, and an available communication network bandwidth associated with the electronic device. The method further comprises processing, by the battery optimization unit, a first portion of sensor data locally based on the degree of criticality of environment and a priority based rule engine, wherein the priority based rule engine is configured to optimize battery usage of the electronic device based on the plurality of parameters.

According to embodiments illustrated herein, there may be provided a system to optimize battery usage of an electronic device. The system comprises a processor and a memory communicatively coupled to the processor. The memory stores processor instructions, which, on execution, causes the processor to determine a degree of criticality of environment in which one or more sensors are operating based on one or more pre-defined conditions. The processor may be configured to determine a plurality of parameters comprising an energy level of the electronic device, an available processing power, and an available communication network bandwidth associated with the electronic device. The processor may be further configured to process a first portion of sensor data locally based on the degree of criticality of environment and a priority based rule engine, wherein the priority based rule engine is configured to optimize battery usage of the electronic device based on the plurality of parameters.

According to embodiments illustrated herein, a non-transitory computer-readable storage medium having stored thereon, a set of computer-executable instructions for causing a computer comprising one or more processors to perform steps of determining a degree of criticality of environment in which one or more sensors are operating based on one or more pre-defined conditions. The one or more processors may further determine a plurality of parameters comprising an energy level of the electronic device, an available processing power, and an available communication network bandwidth associated with the electronic device. The one or more processors may further process a first portion of sensor data locally based on the degree of criticality of environment and a priority based rule engine, wherein the priority based rule engine is configured to optimize battery usage of an electronic device based on the plurality of parameters.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
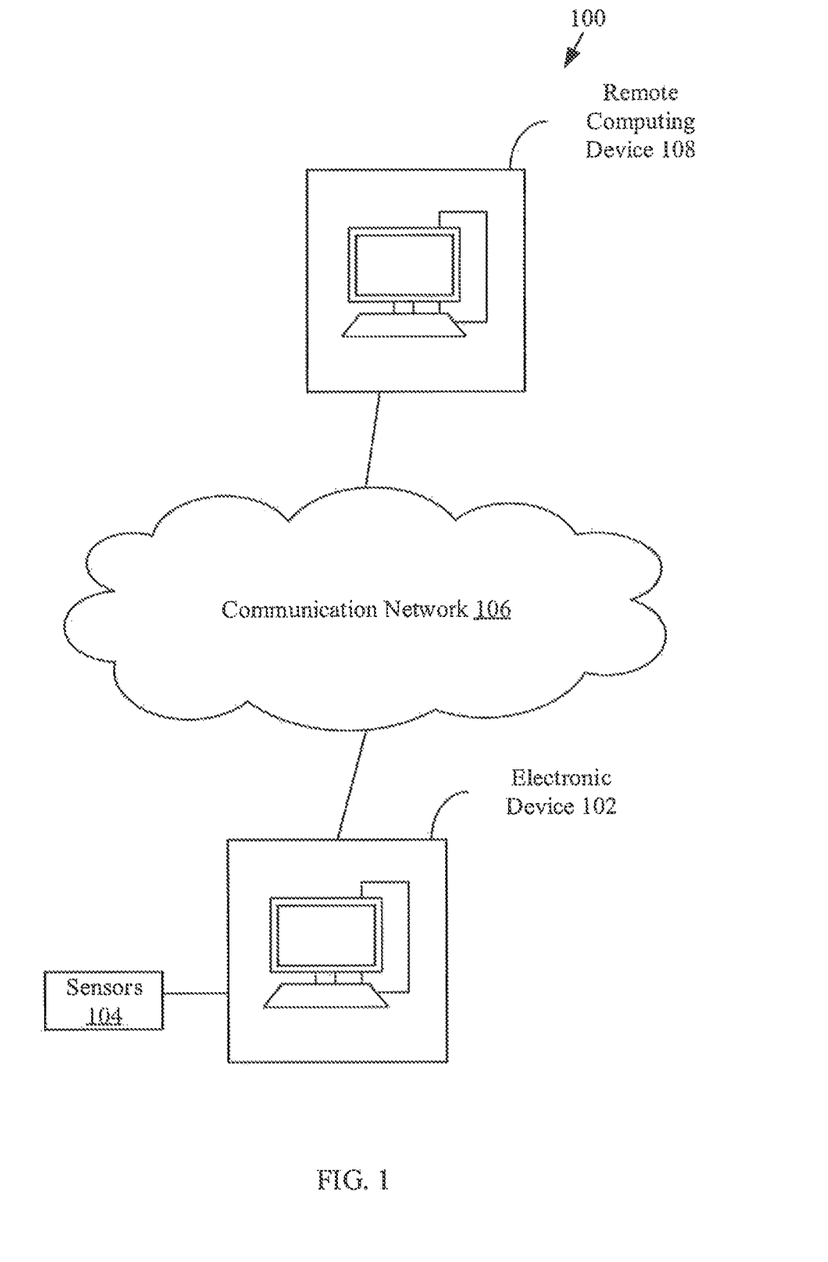
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may correspond to an Internet over Things (IoT) environment. The system environment 100 may include an electronic device 102, a communication network 106, and a remote computing device 108. In an embodiment, one or more sensors 104 may be connected to the electronic device 102. The electronic device 102 may be communicatively coupled to the remote computing device 108 via the communication network 106. In an embodiment, the one or more sensors 104 may be communicatively coupled to the remote computing device 108 via the communication network 106.

In an embodiment, the electronic device 102 may refer to a computing device installed in an environment for capturing sensor data. The electronic device 102 may be connected with one or more sensors 104 for capturing sensor data. The electronic device 102 may comprise of one or more processors and one or more memories. The one or more memories may include computer readable code that may be executable by the one or more processors to perform predetermined operations. In an embodiment, the electronic device 102 may present a user-interface to the user to provide input. In an embodiment, the input may corresponds to at least one of a degree of criticality of the environment, a plurality of threshold parameters associated with each of a corresponding plurality of parameters monitored by the electronic device 102, and the like. In an embodiment, the electronic device 102 may be configured to determine a plurality of parameters comprising an energy level of the electronic device, an available processing power, and an available communication network bandwidth associated with the electronic device 102. In an embodiment, the electronic device 102 may be configured to process a first portion of sensor data locally based on the degree of criticality of environment and a priority based rule engine. In an embodiment, the sensor data comprises of a first portion and a second portion. The first portion of the sensor data is locally processed by the electronic device 102 whereas the second portion is processed by the remote computing device 108. Further, in an embodiment, the electronic device 102 may be configured to configure the priority based rule engine based on one or more machine learning techniques. In an embodiment, the electronic device 102 may include hardware and/or software to display the sensor data on a display screen of the electronic device 102. In an embodiment, the electronic device 102 may be configured to transmit the first portion of the sensor data and the second portion of the sensor data to the remote computing device 108. Examples of the electronic device 102 may include, but are not limited to, a personal computer, a laptop, a personal digital assistant (PDA), a mobile device, a tablet, or any other computing device. The operation of the electronic device 102 has been discussed later in conjunction with FIG. 2.

In an embodiment, the one or more sensors 104 may be configured to capture the sensor data. The one or more sensors may transmit the sensor data to the electronic device 102. Examples of the one or more sensors comprise at least one of an imaging sensor, a temperature sensor, a pressure sensor, a proximity sensor, a biosensor, a humidity sensor, a speed sensor, a tilt sensor, an acceleration sensor, and a motion sensor. In an embodiment, the sensor data captured by the imaging sensor may comprise an image or a video. In an alternate embodiment, the sensor data captured by the temperature sensor may include one or more temperature readings captured at various time instants.

In an embodiment, the communication network 106 may correspond to a communication medium through which the electronic device 102, and the remote computing device 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the remote computing device 108 may refer to a computing device that may be configured to process the second portion of the sensor data. In an embodiment, the remote computing device may be configured to perform one or more predetermined operations on the first portion of the sensor data. The remote computing device 108 may be configured to receive the sensor data comprising the first portion and the second portion from the electronic device 102. In an embodiment, the remote computing device 108 may include hardware and/or software to display the sensor data on a display screen of the remote computing device 108. The remote computing device 108 may comprise of one or more processors and one or more memories. The one or more memories may include computer readable code that may be executable by the one or more processors to perform predetermined operations. Examples of the electronic device 102 may include, but are not limited to, a personal computer, a laptop, a personal digital assistant (PDA), a mobile device, a tablet, or any other computing device.

Figure 2:
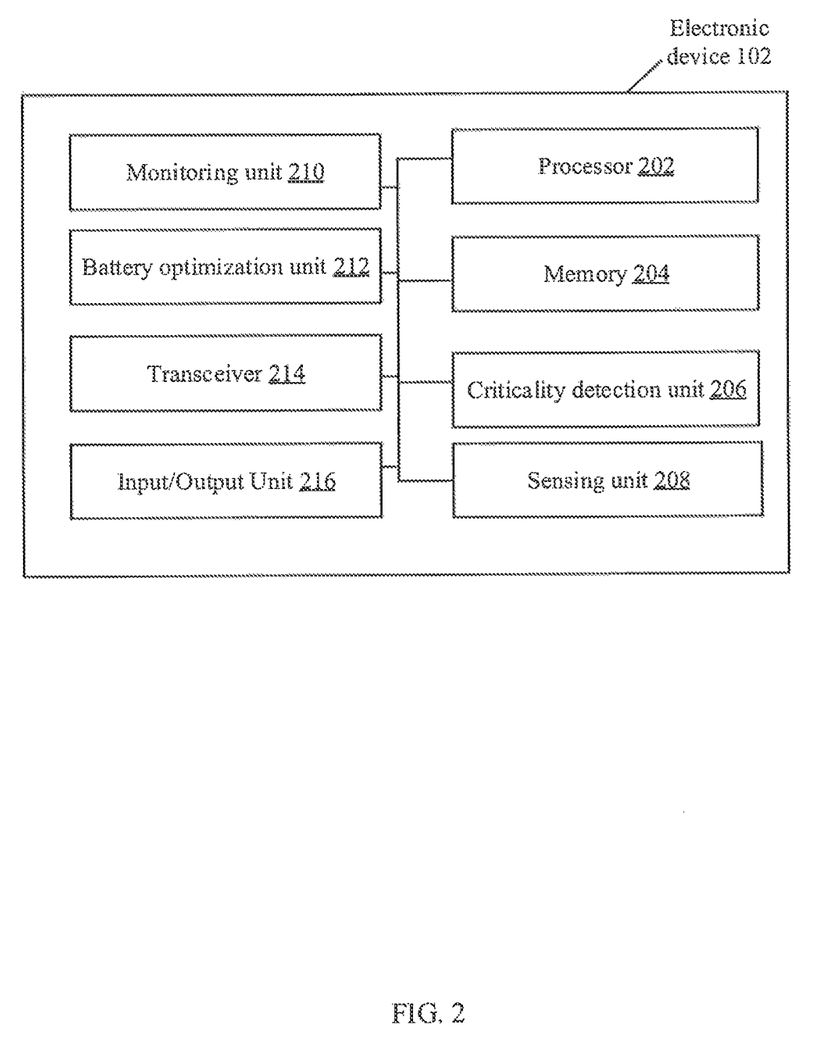
FIG. 2 is a block diagram that illustrates an electronic device configured to optimize battery usage of the electronic device, in accordance with some embodiments of the present disclosure.

FIG. 2 illustrates a block diagram of an electronic device 102 configured to optimize battery usage of the electronic device, according to some embodiments of the present disclosure. The electronic device 102 further comprises a processor 202, a memory 204, a criticality detection unit 206, a sensing unit 208, a monitoring unit 210, a battery optimization unit 212, a transceiver 214, and an input/output unit 216. The processor 202 may be communicatively coupled to the memory 204, the criticality detection unit 206, the sensing unit 208, the monitoring unit 210, the battery optimization unit 212, the transceiver 214, and the input/output unit 216.

The processor 202 comprises suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The criticality detection unit 206 comprises suitable logic, circuitry, interfaces, and/or code that may be configured to determine a degree of criticality of environment in which the one or more sensors 104 are operating based on one or more pre-defined conditions. The one or more predefined conditions may be associated with the environment. For example, if the environment is a medical room and the one or more sensors correspond to a cardiac sensor then the predefined conditions may define a standard range for the sensor data obtained from the cardiac sensor in the medical room. In an alternate embodiment, a user may provide an input that may specify the degree of criticality of environment in which the one or more sensors 104 are operating.

The sensing unit 208 comprises suitable logic, circuitry, interfaces, and/or code that may be configured to capture sensor data. In an embodiment, the sensor data may comprise a first portion and a second portion. The monitoring unit 210 comprises suitable logic, circuitry, interfaces, and/or code that may be configured to determine the plurality of parameters comprising an energy level of the electronic device 102, an available processing power of the electronic device 102, and an available communication network bandwidth associated with the electronic device 102. In an embodiment, monitoring unit 210 may determine the plurality of parameters iteratively after a pre-defined time interval.

The battery optimization unit 212 comprises suitable logic, circuitry, interfaces, and/or code that may be configured to process a first portion of sensor data locally based on the degree of criticality of environment and a priority based rule engine. The battery optimization unit 212 may be further configured to configure the priority based rule engine using one or more machine learning techniques. The priority based rule engine may be configured such that the battery usage of the electronic device may be optimized based on the plurality of parameters. In order to configure the priority based rule engine, the battery optimization unit 212 may assign a value to each of the plurality of parameters to generate a rule. In an embodiment, the value indicates a degree of criticality associated with each of the one or more parameters. Further, the battery optimization unit 212 may compare the rule with a plurality of pre-defined rules to identify one or more operations to be performed while processing the first portion of the sensor data. The battery optimization unit 212 may be further configured to determine a sensor data transfer rate, a time duration for the sensor data transfer and quality associated with the at least one of the first portion of the sensor data and the second portion of the sensor data based on the degree of criticality of environment and the priority based rule engine. In an embodiment, the battery optimization unit 212 may be further configured to control at least one of an image resolution, a compression, format, a transmission rate associated with at least one of the first portion of sensor data and the second portion of sensor data captured by the imaging sensor based on the priority based rule engine. The battery optimization unit 212 may be further configured to process the first portion of sensor data locally based on the degree of criticality of environment and the priority based rule engine.

The transceiver 214 comprises of suitable logic, circuitry, interfaces, and/or code that may be configured to communicate sensor data between the electronic device 102 and the remote computing device 108, via the communication network 106. The transceiver may be further configured to transmit the sensor data comprising the first portion and the second portion to the remote computing device 108 for further processing. The transceiver 214 may implement one or more known technologies to support wired or wireless communication with the communication network. In an embodiment, the transceiver 214 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The Input/Output (I/O) unit 216 comprises suitable logic, circuitry, interfaces, and/or code that may be configured to receive an input or transmit an output. The input/output unit 216 comprises of various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

In operation, the system environment 100 comprises of the one or more sensors 104 associated with the electronic device 102. The electronic device 102 may be communicatively coupled to the remote computing device 108 via the communication network 106. The sensing unit 208 may be configured to capture the sensor data using the one or more sensors 104 associated with the electronic device 102. In an embodiment, the one or more sensors comprise at least one of an imaging sensor, a temperature sensor, a pressure sensor, a proximity sensor, a biosensor, a humidity sensor, a speed sensor, a tilt sensor, an acceleration sensor, and a motion sensor.

The criticality detection unit 206 may be configured to determine the degree of criticality of environment in which the one or more sensors 104 are operating based on one or more pre-defined conditions. In an alternate embodiment, the criticality detection unit 206 may receive an input from the user via the I/O unit 216 that indicates the degree of criticality of the environment. The one or more pre-defined conditions may be specific to the environment in which the one or more sensors 104 are operating. Examples of the one or more pre-defined conditions associated with the environment are illustrated in the table 1 below.

TABLE 1

| # | One or more pre-defined conditions |
|---|---|
| 1 | Blood pressure of a patient in ICU falling below 60 mm Hg |
| 2. | A criminal wanted by police passing in front of the camera, in the midst of the crowd |
| 3. | Humidity of a certain part of the corn field falling below 40% |

After determining the degree of criticality of environment, the monitoring unit 210 may be configured to determine the plurality of parameters comprising the energy level of the electronic device 102, the available processing power of the electronic device 102, and the available communication network bandwidth associated with the electronic device 102. For example, the below table 2 illustrates the values determined by the monitoring unit 210.

TABLE 2

| Parameter | Value |
|---|---|
| energy level of the electronic device | 150 mAh |
| available processing power of the electronic device | 880 MHZ |
| available communication network bandwidth associated with the electronic device | 1 TB |

In an embodiment, monitoring unit 210 may determine the plurality of parameters iteratively after a pre-defined time interval. For example, the monitoring unit 210 may monitor the plurality of parameters after every one minute.

The battery optimization unit 212 may be configured to configure the priority based rule engine that may be utilized to optimize the battery usage of the electronic device 102. The battery optimization unit 212 may assign a binary value to each of the plurality of parameters to generate a plurality of rules. The binary value indicates a degree of criticality associated with each of the plurality of parameters. For the purpose of implementation, the binary value 0 may indicate that the associated parameter is not in critical range whereas the binary value 1 may indicate that the associated parameter is in critical range. In an embodiment, a threshold value may be associated with each of the plurality of parameters. Such a threshold value may be utilized to determine whether the determined values associated with each of the plurality of parameters are below or above the critical range.

For example, the threshold value for energy level of the electronic device is 200 mAh, the threshold value for available processing power of the electronic device is 200 MHZ, and the threshold value for available communication network bandwidth associated with the electronic device is 200 MB. Thus, in such an exemplary scenario based on the defined thresholds and the captured sensor data as illustrated in table 2 the binary value assigned to the energy level of the electronic device is 1. The binary value assigned to the available processing power of the electronic device is 0. The binary value assigned to the available communication network bandwidth associated with the electronic device is 0. Thus, the rule may be depicted as 100. In an embodiment, 8 rules may be generated as a combination of the plurality of parameters. The 8 rules (plurality of rules) may be represented as 000, 001, 010, 100, 110, 101, 011, and 111.

A person skilled in the art will understand that the scope of the disclosure should not be limited to assigning a binary value to each of the plurality of parameters to determine the criticality associated with each of the plurality of parameters. Determining the criticality associated with the plurality of parameters should not be limited based on the aforementioned factors and using the aforementioned techniques. Further, the examples provided in supra are for illustrative purposes and should not be construed to limit the scope of the disclosure.

The battery optimization unit 212 may be configured to map one or more operations associated with each of the plurality of rules to configure the priority based rule engine. In an embodiment, the one or more operations may be performed while processing the sensor data. In an embodiment, one or more machine learning techniques may be utilized to configure the priority based rule engine. For example, the machine learning techniques may learn which one or more operations may be performed when a particular parameter from the plurality of parameters is critical. For the purpose of implementation, a neural network inferred with Perceptron may be utilized to implement the machine learning techniques. The neutral network may be trained for the input-output patterns. The input pattern corresponds to sensor data captured by the sensing unit 208 and the output pattern may be configured manually based on the degree of criticality of the environment. An example of output pattern may correspond to 'extend life span up to time T', 'extend life span up to time 2T', and the like. Based on the configured output, the battery optimization unit 212 may determine the one or more operations to be performed on the sensor data based on the trained neural network.

After the priority based rule engine is configured, the battery optimization unit 212 may be configured to process a first portion of sensor data locally based on the degree of criticality of environment and the priority based rule engine. The battery optimization unit 212 may be configured to compare the rule with a plurality of pre-defined rules to identify one or more operations to be performed while processing the first portion of the sensor data. In an embodiment, the first portion of the sensor data may be processed locally whereas the second portion of the sensor data may be processed by the remote computing device 108. For example, if the energy level of the electronic device 102 and the available processing power of electronic device 102 are not critical then the electronic device 102 may transmit processed result to the remote computing device 108.

After processing the first portion of the sensor data locally, the battery optimization unit 212 may be configured to determine a sensor data transfer rate, a time duration for the sensor data transfer and quality associated with at least one of the first portion of the sensor data and the second portion of the sensor data based on the degree of criticality of environment and the priority based rule engine. For example, in a security camera, the images get down sampled to 1:4, a reasonable resolution for an image to get overall view. The frame rate may be reduced to 10 frames/second. If the bandwidth available for transmission is less, color information gets blocked and only luminance component is transmitted. The bitrate is now (352×240×8 bits×1 luminance×10 frames/second). The data gets compressed to save bandwidth. In on embodiment, H.264 standard is used to get a peal compression of 1:400. When the situation turns critical with the person of interest standing in the field of vision of the camera, (detected by a face detection algorithm), the down sampling stops. The data rate now increases many folds. (352×240×8 bits×3 colors×30 frames/second). The degree of compression relaxed to getter better quality images (through used refined quantization table with smaller step size). The compression ratio can be now 1:50. These factors are related to power consumption through a rule of thumb as 0.2 mw/MIPS. Data quality (e.g., image SNR) is linked to the bitrate. In H.264, 35.5 db corresponds to a bit rate of 600 Kbps. Based on the available bandwidth, the SNR is to be selected and down sample, channels (color, intensity), quantization steps, frame rate, frame size values are to be set. Encoding of a 352×288 picture at 30 fps takes about 80,000 MIPS while it takes about 5737 MIPS with JPEG 2000. However the degree of compression is far high with H,264 for the same SNR. Based on the available MIPS, the compression standard is to be selected.

In an embodiment, the battery optimization unit 212 may be further configured to control at least one of an image resolution, a compression format, a transmission rate associated with at least one of the first portion of sensor data and the second portion of sensor data captured by the imaging sensor based on the priority based rule engine.

After processing the first portion of the sensor data locally and determining one or more factors associated with the sensor data as mentioned above, the transceiver 214 may be configured to transmit the processed first portion of the sensor data and second portion of the sensor to the remote computing device 108. The processed first portion of the sensor data and the second portion of the sensor may be transmitted to the remote computing device 108 through one or more hops via the communication network 106. Further, the remote computing device 108 may be configured to receive the processed first portion of the sensor data and the second portion of the sensor data. The remote computing device 108 may be configured to process the second portion of the sensor data. Additionally, the remote computing device 108 may be configured to perform one or more operations on the processed first portion of the sensor data. For example, routine face detection of the people captured from the security camera. When the person is of any interest (one in the database of wanted list), the face would get tracked subsequently with high quality images.

In an exemplary implementation of the method and system described herein, the one or more sensors may correspond to an imaging sensor. Example of the imaging sensor may be an IoT camera that may be connected to the electronic device 102. The sensing unit 208 may be configured to capture images and/or videos (sensor data) via the imaging sensor. In an embodiment, the criticality detection unit 206 may be configured to detect the degree of criticality of the environment based on environmental changes. For example, if the scene in front of the imaging sensor changes very fast in the captured images and/or videos then it indicates that substantial activity in front of the imaging sensor. The criticality detection unit 206 may be configured to detect the motion vector associated with each of the images and/or videos to determine the environment changes. Such scenarios may include a sudden flush of people at the airport. Under such an environment, it is important to capture images for a longer duration and at the same time optimize battery usage. Additionally, facial part of the images need to be captured with good resolution. In an alternate embodiment, if there is no activity in front of the imaging sensor then the images may be captured in low resolution.

After determination of the degree of criticality of the environment in which the imaging sensor is operation, the monitoring unit 210 may be configured to monitor the plurality of parameters comprising the energy level of the electronic device 102, an available processing power of the electronic device 102, and an available communication network bandwidth associated with the electronic device 102. In an embodiment, the monitoring unit may be configured to monitor the plurality of parameters after every 1000 frames captured by the sensing unit 208. In an embodiment, the energy level of the electronic device 102 may be monitored using built in APIs in the imaging sensor. In an embodiment, the available communication network bandwidth may be determined by implementing one or more bandwidth computation algorithms over the communication network 106.

After monitoring the plurality of parameters, the battery optimization unit 212 may be configured to utilize the configured priority based rule engine to optimize battery usage of the electronic device 102. The battery optimization unit 212 may assign a binary value to each of the plurality of parameters to generate the plurality of rules. The binary value indicates a degree of criticality associated with each of the plurality of parameters. Further, one or more operations may be associated with each of the plurality of rules. Such one or more operations may be performed on the first portion of the captured sensor data i.e. images and or videos. Table 3 shown below illustrates the configured priority based rule engine that comprises plurality of rules and the one or more operations that may be performed on the first portion of the captured sensor data i.e. images and or videos.

TABLE 3

| Rule | If (scenario) | Do this (steps) | One or more operations to be performed by the electronic device |
| --- | --- | --- | --- |
| 000 | There is no immediate constraint on energy level of electronic device, available processing power (for processing the video at 30 fps) and available communication network bandwidth (all parameters above threshold) | The priority is for processing sensor data locally and conserving network bandwidth; transfer the processed results/compressed video over the communication network | 30 frames 4:4:4 format (y cb cr) BMP images |
| 001 | Communication Network bandwidth critical | The priority is processing sensor data locally and conserving communication network bandwidth; transfer the processed results/compressed video | 15 frames 4:2:0 AVC compression (or any standard compression) Tiff images (or any compression |

TABLE 3-continued

| Rule | If (scenario) | Do this (steps) | One or more operations to be performed by the electronic device |
|---|---|---|---|
| | | over the communication network | standard) |
| 010 | Processing power is critical; Not available to process video fully | Process a first portion of the video (use full processing power). Transfer partially processed video over the communication network | 30 frames, 4:4:4 format |
| 011 | Processing power is critical Network bandwidth critical | Reduce the sensor data (as in BPN 04 to 07) Process a first portion of the video (use full processing power). Transfer partially processed video over the communication network | 15 frames 4:2:0 AVC compression (or any standard compression) Tiff images (or any compression standard) |
| 100 | Energy level is critical; High priority for this. | Reduce sensor data (event driven data capture) | 4:2:0 without filter less than 15 frames per second (linked to battery power) |
| 101 | Energy level and Communication Network bandwidth critical | Reduce the sensor data; Process a first portion of the video (use full processing power). Transfer partially processed video over the communication network | AVC compression (or any standard compression) Tiff images (or any compression standard) 4:2:0 without filter less than 10 frames per second |
| 110 | Energy level and processing power is critical | Reduce the sensor data; Process a first portion of the video (use full processing power). Transfer partially processed video over the communication network | 4:2:0 without filter less than 10 frames per second |
| 111 | Energy level, processing power, and Communication Network bandwidth is critical | Reduce the sensor data; Process a first portion of the video (use full processing power). Transfer partially processed video over the communication network | 4:2:0 without filter less than 10 frames per second |

Based on the priority based rule engine illustrated in table 3, the battery optimization unit 212 may be configured to process the first portion of the sensor data locally and the second portion of the sensor data at the remote computing device 108. The battery optimization unit 212 may be configured to control at least one of an image resolution, a compression format, a transmission rate associated with at least one of the first portion of sensor data and the second portion of sensor data captured by the imaging sensor based on the priority based rule engine as illustrated in table 3. For example, image resolution may be reduced by processing of alternate pixels for y, cb, cr. In an embodiment, the user can specify a duration for which the imaging sensor is required to operate. Based on this, the imaging sensor can show an actual image or a down sampled low quality image that the imaging sensor can certainly support for said duration. The user can have the option of reducing framerates in the imaging sensor and improving resolution of the captured sensor data.

After processing the first portion of the sensor data, the transceiver 214 may be configured to transmit the processed first portion of the sensor data and second portion of the sensor to the remote computing device 108. The remote computing device 108 may be configured to receive the processed first portion of the sensor data and the second portion of the sensor data. The remote computing device 108 may be configured to process the second portion of the sensor data. Additionally, the remote computing device 108 may be configured to perform one or more operations on the processed first portion of the sensor data.

In an exemplary scenario, a camera installed at the airport (or a shopping mall) entrance may capture the images of people moving around at 10 frames per second. The images are cleaned for noise and compressed using JPEG (a standard example) before transmission to reduce storage space and transmission bandwidth. The camera does not process (clean or compress) the images when there is no activity (change in the action) in front of the camera thereby saving processing power, communication network bandwidth and the energy level of the camera. Images are often cropped/down sampled to reduce further processing. For example, only the macroblocks corresponding to face of the people may be retained in original form. Other macroblocks of the image may be subjected to 4:2:0 down sampling as they do not contain necessary information at the given point of time. In an embodiment, the processing power, the energy level, and communication network bandwidth may be continuously monitored. Depending on plurality of parameters, one of the optimal options would be triggered (the possibilities are listed in the table 3). Accordingly, the frame rate may be reduced or processing may be partial (and thereby achieve power saving by reducing load on local processor of the camera)

Further, when the person of interest (already stored in camera) passes in front of the camera, the dynamics would change. The focus would shift to the region (face) of interest. This region would be provided higher importance compared to other regions. Consequently, this region would be tracked i.e. focus or camera zoom happens for this region. The other fasces or regions in the image are of less importance. Due to zooming, the full person would be covered in the image at the cost of losing other faces. This is how criticality of data capture automatically gets enforced based on the situation or need of the data (in a medical sensor, based on the patent condition, data sampling rate can alter automatically). It can also be set in manually for example, the security control room can enforce this situation to monitor specific people one they are in the field of vision of camera. As an embodiment for the manual detection of the criticality, disaster management (detection of survivors in earthquake, fire etc.) by a robot may be considered. Based on the determined degree of criticality and the configured priority based rule engine, the battery optimization unit 212 may process a first portion of the sensor data locally, reduce of framerates captured, down sampling of regions other than region of interest and the like. The goal is to prolong capability to capture images at reasonably good quality. It often calls for partial processing of images and such partial processing may be performed locally at the camera (electronic device 102).

A person skilled in the art will understand that the scope of the disclosure should not be limited to optimizing the battery usage of the electronic device 102 based on the aforementioned factors and using the aforementioned techniques. Further, the examples provided in supra are for illustrative purposes and should not be construed to limit the scope of the disclosure.

Figure 3:
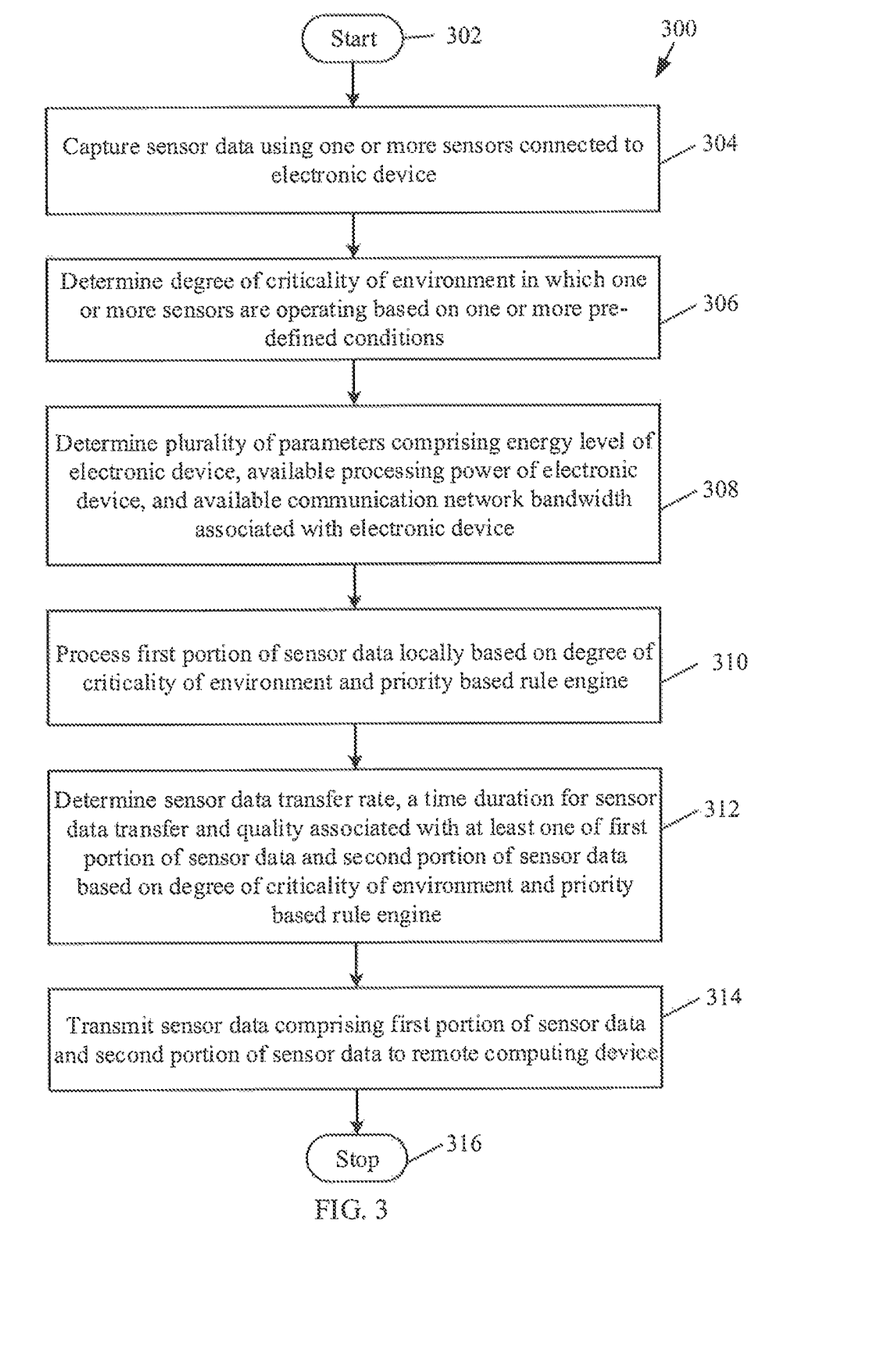
FIG. 3 is a flowchart illustrating a method for optimizing battery usage of the electronic device, in accordance with some embodiments of the present disclosure.

FIG. 3 is a flowchart illustrating a method 300 for optimizing battery usage of the electronic device 102, in accordance with some embodiments of the present disclosure. The method starts at step 302 and proceeds to step 304. At step 304, the electronic device 102 may capture sensor data using one or more sensors 104 connected to the electronic device 102. At step 306, the electronic device 102 may determine the degree of criticality of environment in which the one or more sensors 104 are operating based on the one or more pre-defined conditions. At step 308, the electronic device 102 may determine the plurality of parameters comprising the energy level of the electronic device 102, the available processing power of the electronic device 102, and the available communication network bandwidth associated with the electronic device 102. At step 310, the electronic device 102 may process the first portion of the sensor data locally based on the degree of criticality of environment and the priority based rule engine. At step 312, the electronic device 102 may determine a sensor data transfer rate, a time duration for the sensor data transfer and quality associated with the at least one of the first portion of sensor data and the second portion of sensor data based on the degree of criticality of environment and the priority based rule engine. At step 314, the electronic device 102 may transmit the sensor data comprising the first portion of the sensor data and the second portion of sensor data to the remote computing device 108. Control passes to end step 316.

Computer System

Figure 4:
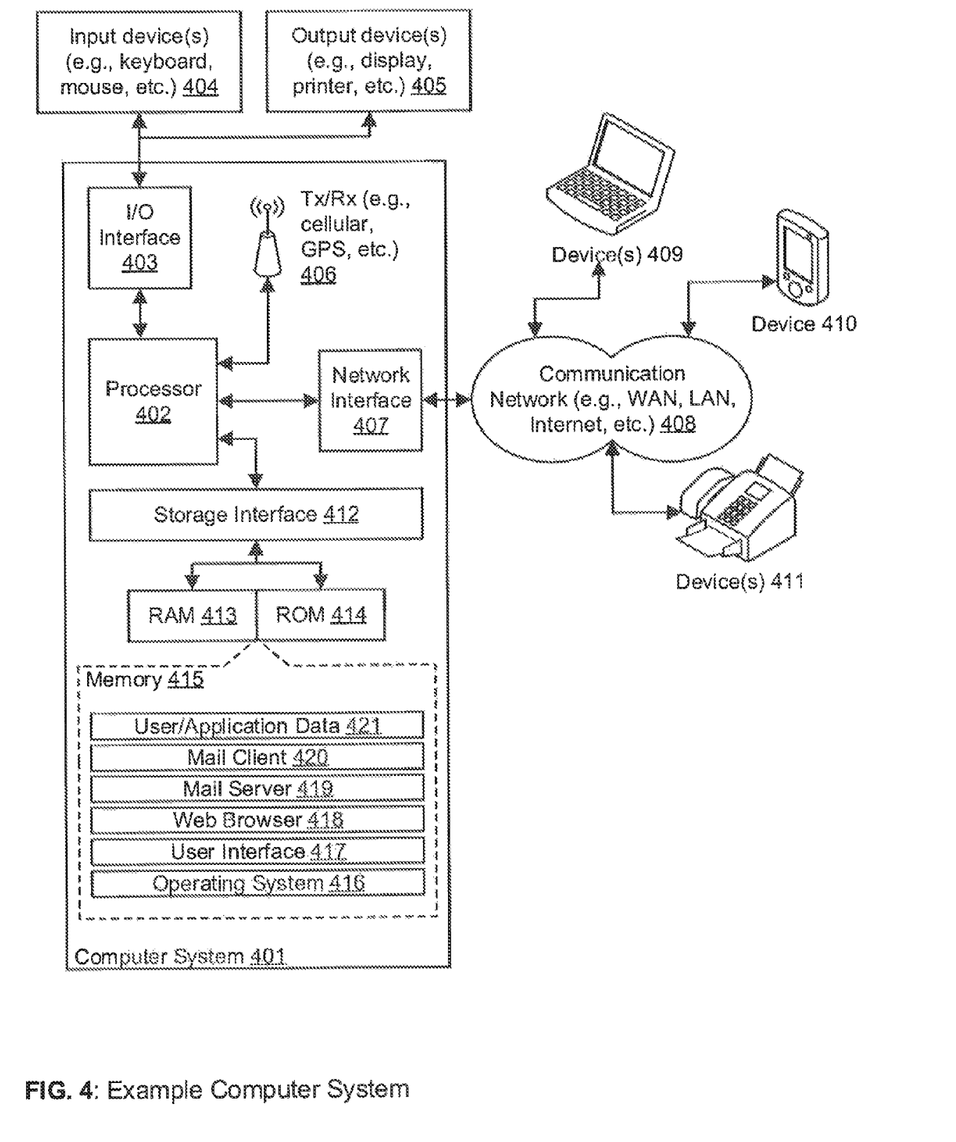
FIG. 4 illustrates a block diagram of an exemplary computer system for implementing embodiments consistent with the present disclosure.

FIG. 4 illustrates a block diagram of an exemplary computer system for implementing embodiments consistent with the present disclosure. Variations of computer system 401 may be used for optimizing battery usage of the electronic device 102. The computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM47501IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for optimizing battery usage of an electronic device, the method comprising:
   determining, by a criticality detection unit of the electronic device, a degree of criticality of environment in which one or more sensors are operating based on one or more pre-defined conditions, the electronic device receiving sensor data captured from the one or more sensors;
   determining, by a monitoring unit of the electronic device, a plurality of parameters comprising at least one of an energy level of the electronic device, an available processing power, and an available communication network bandwidth associated with the electronic device; and
   processing, by a battery optimization unit of the electronic device, a first portion of the sensor data locally based on the degree of criticality of environment and a priority based rule engine, wherein the priority based rule engine is configured to optimize battery usage of the electronic device based on the plurality of parameters by:
      assigning a value to each of the plurality of parameters to generate a rule, wherein the value indicates a degree of criticality associated with each of the one or more parameters, and
      comparing the rule with a plurality of rules to identify one or more operations to be performed while processing the data.

2. The method of claim 1, further comprising transmitting a second portion of sensor data to a remote computing device.

3. The method of claim 2, further comprising determining a sensor data transfer rate, a time duration for the sensor data transfer and quality associated with the at least one of the first portion of sensor data and the second portion of sensor data based on the degree of criticality of environment and the priority based rule engine.

4. The method of claim 1, wherein one or more machine learning techniques are utilized to configure the priority based rule engine.

5. The method of claim 2, wherein the one or more sensors comprise at least one of an imaging sensor, a temperature sensor, a pressure sensor, a proximity sensor, a biosensor, a humidity sensor, a speed sensor, a tilt sensor, an acceleration sensor, and a motion sensor.

6. The method of claim 5, further comprising controlling at least one of an image resolution, a compression format, a transmission rate associated with at least one of the first portion of sensor data and the second portion of sensor data captured by the imaging sensor based on the priority based rule engine.

7. The method of claim 1, wherein the plurality of parameters are determined iteratively after a pre-defined time interval.

8. A system to optimize battery usage of an electronic device, the system comprising:
   a processor; and
   a memory communicatively coupled to the processor, wherein the memory stores processor instructions, which, on execution, causes the processor to:
      determine a degree of criticality of environment in which one or more sensors are operating based on one or more pre-defined conditions the electronic device receiving sensor data captured from the one or more sensors;
      determine a plurality of parameters comprising at least one of an energy level of the electronic device, an available processing power, and an available communication network bandwidth associated with the electronic device; and
      process a first portion of the sensor data locally based on the degree of criticality of environment and a priority based rule engine, wherein the priority based rule engine is configured to optimize battery usage of the electronic device based on the plurality of parameters by:
         assigning a value to each of the plurality of parameters to generate a rule, wherein the value indicates a degree of criticality associated with each of the one or more parameters, and
         comparing the rule with a plurality of rules to identify one or more operations to be performed while processing the data.

9. The system of claim 8, wherein the processor is further configured to transmit a second portion of sensor data to a remote computing device.

10. The system of claim 9, wherein the processor is further configured to determine a sensor data transfer rate, a time duration for the sensor data transfer and quality associated with the at least one of the first portion of sensor data and the second portion of sensor data based on the degree of criticality of environment and the priority based rule engine.

11. The system of claim 8, wherein one or more machine learning techniques are utilized to configure the priority based rule engine.

12. The system of claim 9, wherein the one or more sensors comprise at least one of an imaging sensor, a temperature sensor, a pressure sensor, a proximity sensor, a biosensor, a humidity sensor, a speed sensor, a tilt sensor, an acceleration sensor, and a motion sensor.

13. The system of claim 12, wherein the processor is further configured to control at least one of an image resolution, a compression format, a transmission rate associated with at least one of the first portion of sensor data and the second portion of sensor data captured by the imaging sensor based on the priority based rule engine.

14. The system of claim 8, wherein the plurality of parameters are determined iteratively after a pre-defined time interval.

15. A non-transitory computer-readable storage medium having stored thereon, a set of computer-executable instructions for causing a computer comprising one or more processors to perform steps comprising:
   determining, by the one or more processors, a degree of criticality of environment in which one or more sensors are operating based on one or more pre-defined conditions, wherein an electronic device receives sensor data captured from the one or more sensors;
   determining, by the one or more processors, a plurality of parameters comprising at least one of an energy level of the electronic device, an available processing power, and an available communication network bandwidth associated with the electronic device; and processing, by the one or more processors, a first portion of the sensor data locally based on the degree of criticality of environment and a priority based rule engine, wherein the priority based rule engine is configured to optimize battery usage of an electronic device based on the plurality of parameters by:
assigning a value to each of the plurality of parameters to generate a rule, wherein the value indicates a degree of criticality associated with each of the one or more parameters; and comparing the rule with a plurality of rules to identify one or more operations to be performed while processing the data.

* * * * *